US010264215B1

(12) United States Patent
Sadanand

(10) Patent No.: US 10,264,215 B1
(45) Date of Patent: Apr. 16, 2019

(54) SERVER AND METHOD ENABLING AUGMENTED REALITY (AR) OBJECT SHARING

(71) Applicant: Mastercard International Incorporated, Purchase, NY (US)

(72) Inventor: Rajesh Krishna Sadanand, Bangalore (IN)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 15/867,413

(22) Filed: Jan. 10, 2018

(30) Foreign Application Priority Data

Dec. 18, 2017 (SG) .......................... 10201710540Q

(51) Int. Cl.
| | | |
|---|---|---|
| *H04N 7/14* | (2006.01) | |
| *H04N 7/15* | (2006.01) | |
| *G06F 17/30* | (2006.01) | |
| *G06Q 20/02* | (2012.01) | |
| *G06Q 20/40* | (2012.01) | |
| *G06Q 30/06* | (2012.01) | |
| *G06T 19/00* | (2011.01) | |

(52) U.S. Cl.
CPC ............... *H04N 7/15* (2013.01); *G06Q 20/02* (2013.01); *G06Q 20/4014* (2013.01); *G06T 19/006* (2013.01); *H04N 7/147* (2013.01); *G06F 17/30312* (2013.01); *G06F 17/30876* (2013.01); *G06Q 30/0633* (2013.01)

(58) Field of Classification Search
CPC combination set(s) only.
See application file for complete search history.

(56) References Cited

U.S. PATENT DOCUMENTS

| | | | |
|---|---|---|---|
| 2016/0210602 A1* | 7/2016 | Siddique | ............ G06Q 20/0453 |
| 2017/0132823 A1* | 5/2017 | Zamer | .................... H04L 67/20 |
| 2018/0158060 A1* | 6/2018 | Adams | ................ G06Q 20/409 |
| 2018/0165754 A1* | 6/2018 | Motenko | ................ G06Q 50/12 |

* cited by examiner

*Primary Examiner* — Phung-Hoang J Nguyen
(74) *Attorney, Agent, or Firm* — Hovey Williams LLP

(57) ABSTRACT

There is provided a server enabling Augmented Reality (AR) object sharing between a first party and a second party, the server comprising at least one processor, and at least one memory including computer program code, the at least one memory and the computer program code configured to, with the at least one processor, cause the server at least to receive, from a first party device, data corresponding to a selection of an object by the first party, retrieve, from a database operationally coupled with the server, an AR object relating to the received data in response to the receipt of the data, provide, to the second party device, an instruction to display the retrieved AR object, and receive, from the second party device, an input from the second party in relation to the AR object, the input comprising one or more comments of the second party.

20 Claims, 13 Drawing Sheets

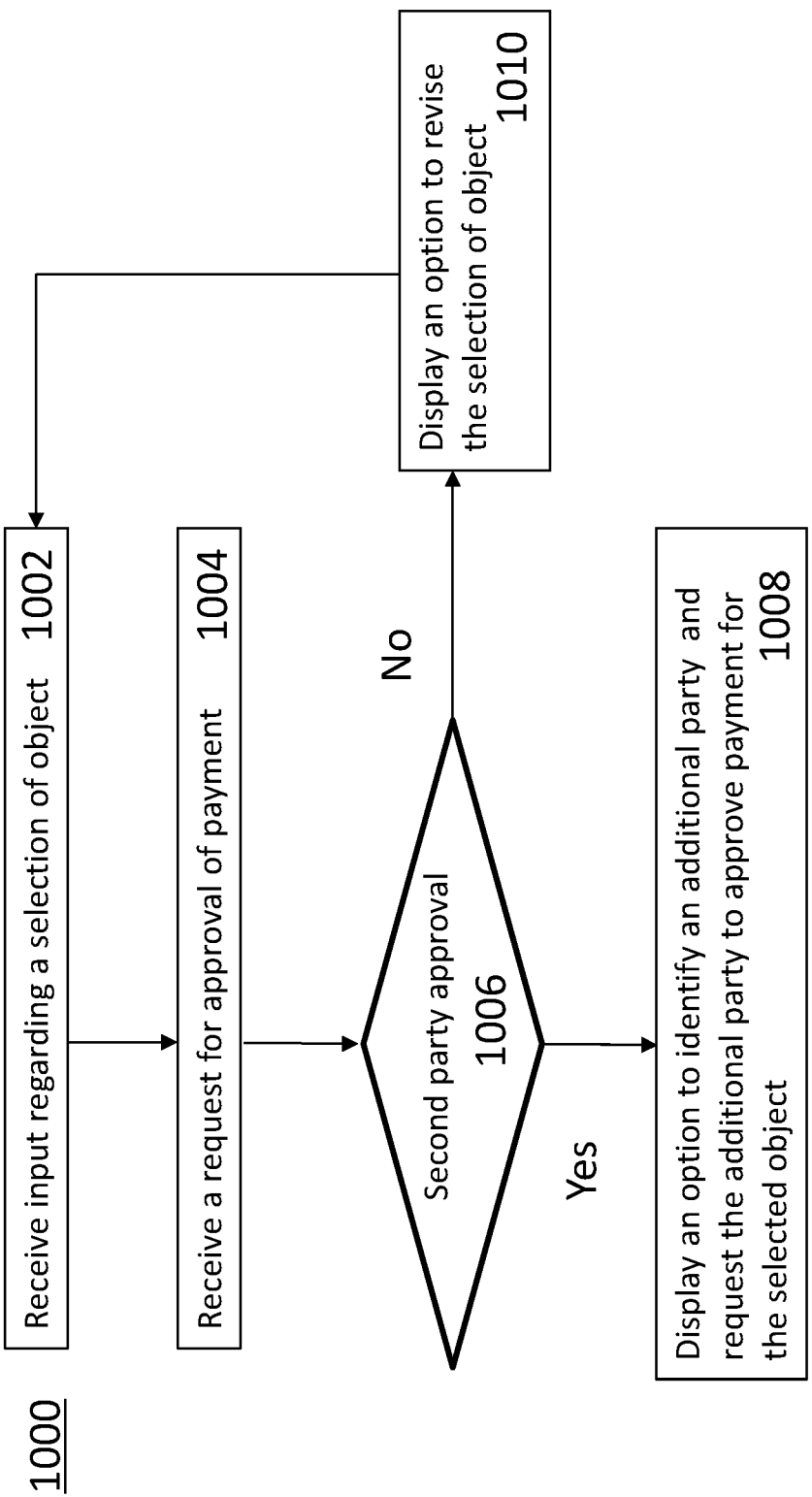

SERVER AND METHOD ENABLING AUGMENTED REALITY (AR) OBJECT SHARING

CROSS-REFERENCE TO RELATED APPLICATIONS

This application claims the priority of Singapore Application Serial No. 10201710540Q, filed Dec. 18, 2017, which is incorporated herein by reference in its entirety

FIELD OF INVENTION

The present invention relates broadly, but not exclusively, to servers and methods for enabling augmented reality (AR) objects sharing.

BACKGROUND

Recently, communications among two or more devices such as mobile devices are commonly performed in a daily basis for various purposes. Text messaging, telephone call and video conference are useful for two or more parties to ask the other party to check, review, confirm on a specific matter. However, information exchanged via a conventional communication means such as text messaging, telephone call and video conference are limited and it is troublesome and time consuming to exchange detailed information via the conventional communication means.

For example, if a first party wants to show a table at a physical store to a second party who is remotely located from the first party, such as in a house of the second party, the conventional communication means may not be useful for the first party to provide the second party with detailed information such as appearance from a specific angle or size compared with other object such as a chair. Without receiving detailed requests from the second party and taking several photos and/or videos in accordance with the detailed requests from the second party, it is not possible for the first party to provide the second party with the detailed information which is tailored for the second party via the conventional communication means. Even if the detailed information may be provided to the second party, it is impossible for the second party to give feedback such as one or more comments on the detailed information.

Also, even if the detailed information may be provided to the second party, the second party can only see the table in an environment of the first party, e.g. a physical store, and cannot see the table in an environment of the second party, e.g. the house of the second party and cannot know how the table fits in the environment of the second party. Also, what can be seen from the second party may be limited by the information provided by the first party. For example, the second party cannot zoom-in, zoom-out, rotate or move the table. It is also not possible for the second party to share the table in a rotated or moved position.

A need therefore exists to provide methods and systems enabling augmented reality (AR) objects sharing that address one or more of the above-mentioned problems.

SUMMARY

According to a first aspect of the present invention, there is provided a server enabling Augmented Reality (AR) object sharing between a first party and a second party, the server comprising at least one processor, and at least one memory including computer program code, the at least one memory and the computer program code configured to, with the at least one processor, cause the server at least to receive, from a first party device, data corresponding to a selection of an object by the first party, retrieve, from a database operationally coupled with the server, an AR object relating to the received data in response to the receipt of the data, provide, to the second party device, an instruction to display the retrieved AR object, and receive, from the second party device, an input from the second party in relation to the AR object, the input comprising one or more comments of the second party.

According to a second aspect of the present invention, there is provided a video conference server enabling Augmented Reality (AR) object sharing between a first party and a second party, the server comprising at least one processor, and at least one memory including computer program code, the at least one memory and the computer program code configured to, with the at least one processor, cause the server at least to receive, from a first party device, data corresponding to a selection of an object by the first party, retrieve, from a database operationally coupled with the server, an AR object relating to the received data in response to the receipt of the data, provide, to the second party device, an instruction to display the retrieved AR object, and receive, from the second party device, an input from the second party in relation to the AR object, the input comprising one or more comments of the second party.

According to a third aspect of the present invention, there is provided a method for enabling Augmented Reality (AR) object sharing between a first party and a second party, including receiving, from a first party device, data corresponding to a selection of an object by the first party, retrieving, from a database operationally coupled with the server, an AR object relating to the received data in response to the receipt of the data, providing, to the second party device, an instruction to display the retrieved AR object, and receiving, from the second party device, an input from the second party in relation to the AR object, the input comprising one or more comments of the second party.

According to a fourth aspect of the present invention, there is provided a method for enabling Augmented Reality (AR) object sharing between a first party and a second party in a video conference server, including receiving, from a first party device, data corresponding to a selection of an object by the first party, retrieving, from a database operationally coupled with the server, an AR object relating to the received data in response to the receipt of the data, providing, to the second party device, an instruction to display the retrieved AR object, and receiving, from the second party device, an input from the second party in relation to the AR object, the input comprising one or more comments of the second party.

BRIEF DESCRIPTION OF THE DRAWINGS

Embodiments of the invention will be better understood and readily apparent to one of ordinary skill in the art from the following written description, which provides examples only, and in conjunction with the drawings in which:

FIG. 10A shows a flow diagram illustrating a method for seeking authentication for payment in relation to an AR object sharing between a first party and a second party according to various embodiments.

DETAILED DESCRIPTION

Overview

Figure 1A:
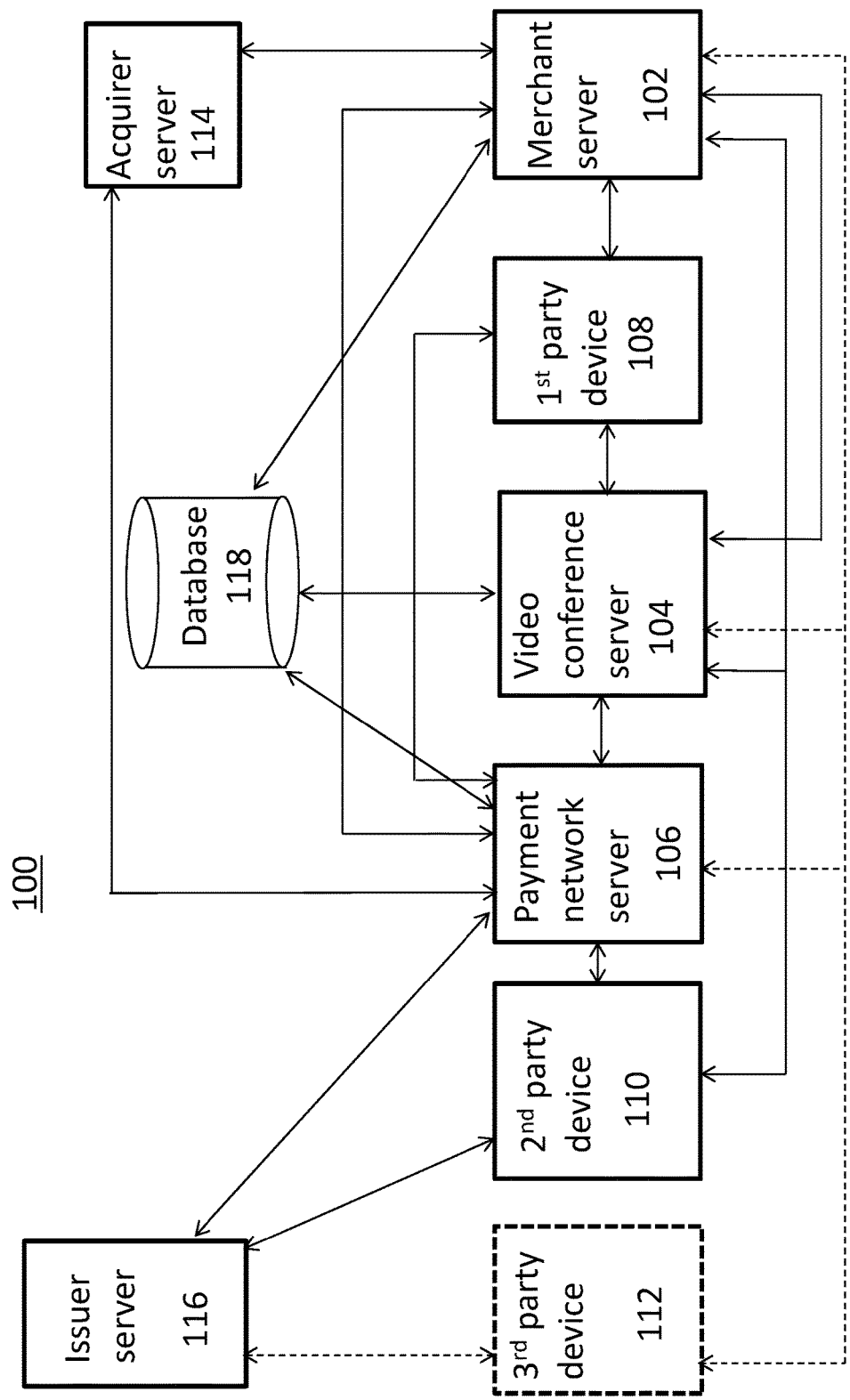
FIG. 1A shows a block diagram illustrating a server enabling AR object sharing according to various embodiments.

Various embodiments provide servers and methods for enabling AR objects sharing.

The following disclosure provides a solution for addressing or mitigating at least one of the above discussed drawbacks. One solution is to enable Augmented Reality (AR) object sharing between the first party and the second party in a two-way communication. Recently, AR technology is increasingly enabling for a user to feel as if an actual object exists in front of the user when the user see an AR object relating to the actual object through a device. In general, the AR object is displayed on a screen of a device such as a mobile phone, a tablet computer and a Head Mount Display so that an actual object exists. In an example, the AR object is shared from the first party to the second party in addition to a conventional communication means such as text, voice and video so that the second party can have a flexibility in controlling of the AR object. For example, if the second party wishes to see details of an object via a conventional video conference, the second party may request the first party to adjust a position of a camera capturing the object. However, by sharing the AR object, the second party can zoom-in and zoom-out the AR object freely. The second party can also rotate the AR object to a preferred angle without requesting the first party to adjust the position of the camera capturing the object. More importantly, the second party may provide the first party with feedback on the shared AR object such as the preferred angle with one or more comments. That is, sharing an AR object between the first party and the second party in a two-way communication enables for both the first party and the second party to obtain detailed information and save time and troubles for both the first party and the second party, which significantly enhances experiences of the first party and the second party.

In an example, a first party having a first party device selects an object. Then, the first party device sends data relating to the selected object to a server. The server is configured to retrieve an AR object relating to the received data from a database operationally coupled to the server. The server provides an instruction to a second party device to display the retrieved AR object so that a second party can see the AR object as if an actual object relating to the AR object exists in an environment of the second party. Furthermore, the second party can provide one or more comments in relation to the AR objects, which enables two-way communication in relation to the AR object sharing.

The following disclosure thus provides advantages, such as enabling AR object sharing between the first party and the second party in a two-way communication for enhancing communication between the first party and the second party. That is, the first party and the second party are able to share detailed information which facilitates a decision making such as determining whether or not to purchase an object. Even if the first party and the second party are remotely located, the AR object sharing in a two-way communication enables the first party and the second party to discuss on an object as if they are facing the object in the same location. Also, the enhanced provision of information for decision making such as purchasing an object will significantly increase satisfaction of the first party and the second party. As a result, a purchasing activity in which the decision making is facilitated by the AR object sharing is expected to be increased.

Although only a two-way communication between two parties such as a first party and a second party is discussed in the above, a multi-way communication among more than two parties may be also possible. For example, a third party may join in the two-way communication.

Terms Description (in Addition to Plain and Dictionary Meaning of Terms)

Unless context dictates otherwise, the following terms will be given the meaning provided here:

The term "augmented reality" refers to a technology displaying one or more two dimensional or three dimensional objects on a device such as a mobile device, a tablet computer or a head mount display device so that the one or more two dimensional or three dimensional objects exist in an environment of a user of the device. The environment of the user can be captured by a camera of the device and displayed together with the one or more two dimensional or three dimensional objects. Alternatively, the user can see the environment of the user through a transparent display which shows the one or more two dimensional or three dimensional objects. Although the term "augmented reality" or "AR" is used in this disclosure, the term "mixed reality", "MR", hybrid reality, substitutional reality or any other terminologies can be applicable in a similar manner.

The term "first party" refers to a party initiating the AR object sharing using a first party device. The first party may include a person who is selecting an object for purchasing at a physical store or an electronic commerce (E-commerce) store. In various embodiments, the first party may be one, who is authorised by a holder of an account, to use the account. For example, the first party may use the account on behalf of the holder of the account as long as the amount to be used does not exceed a predetermined amount.

The term "first party device" refers to a device which can select and/or display an AR object. The first party device may be a mobile device which includes any device including mobile phone, tablet computer, wearable device such as Head Mount Display etc.

The term "second party" refers to a party participating in the AR object sharing using a second party device. The second party may include a person who is determining whether or not to purchase the object selected by the first party at a physical store or an electronic commerce (E-commerce) store.

The term "second party device" refers to a device which can display an AR object. The second party device may be a mobile device which includes any device including mobile phone, tablet computer, wearable device such as Head Mount Display etc.

The term "database" or "databases" refer to any databases located within a computing system or remote server such as a computer in a cloud server. The database or databases may each be a cloud database running on a cloud computing platform.

Exemplary Embodiments

Embodiments of the present invention will be described, by way of example only, with reference to the drawings. Like reference numerals and characters in the drawings refer to like elements or equivalents.

FIG. 1A shows a block diagram of enabling an AR object sharing between a first party, a second party and optionally a third party according to various embodiments. In an example, the AR object sharing is performed by at least a merchant server 102, a video conference server 104, a payment network server 106, a first party device 108, a second party device 110, a third party device 112, an acquirer server 114, an issuer server 116 and a database 118. The AR object sharing may be performed between two parties, e.g. the first party device 108 and the second party device 110. Also, optionally, the AR object sharing may be performed among more than two devices each managed by a different party, e.g. the first party device 108, the second party device 110 and the third party device 112. Thus, the optional third party device 112 is linked with dotted line instead of solid line in FIG. 1A.

In an example, the merchant server 102 may be a server relating to a merchant offering one or more objects to be selected by a first party. The merchant server 102 may be configured to communicate with the video conference server 104, the payment network server 106, the first party device 108, the second party device 110, the acquirer server 114 and the database 118. In an example, the merchant server 102 may be a server for an electronic commerce (E-commerce) store or a physical merchant store. The merchant server 102 may generate an AR object relating to the one or more objects offered by the merchant and save the AR object in the database 118. The merchant server 102 may receive, from the first party device 108, data corresponding to a selection of an object and forward the data to at least the video conference server 104 and the payment network server 106.

In an example, the video conference server 104 may be a server for facilitating or providing a video conference between the first party device 108 and the second party device 110. That is, in other embodiments, the video conference server 104 may be configured to provide a video conference among the first party device 108, the second party device 110 and the third party device 112. The video conference server 104 may be configured to communicate with the merchant server 102, the payment network server 106, the first party device 108, the second party device 110 and the database 118. The video conference server 104 may be configured to receive information from the merchant server 102, for example data relating to a selection of an object. In an example, the video conference server 104 may retrieve an AR object from the database 118 and provide an instruction to the second party device to display the retrieved AR object as a segment of the video conference between the first party device and the second party device.

In an example, the payment network server 106 may be a server for facilitating payment transaction between a first party and a merchant. The payment network server 106 may be configured to communicate with at least one of the merchant server 102, the video conference server 104, the first party device 108, the second party device 110, the third party device 112, the acquirer server 114, the issuer server 116 and the database 118. The payment network server 106 may be configured to facilitate payment between a first party and a merchant. In some embodiments, the payment network server 106 may be configured to receive and forward message to the second party device and/or the third party device in order to facilitate payment between the first party and the merchant.

In an example, the payment network server 106 may receive, from the first party device 108, data corresponding to a selection of an object by the first party. The payment network server 106 may retrieve, from the database 118 operationally coupled with the payment network server 106, an AR object relating to the received data in response to the receipt of the data. The payment network server 106 may provide, to the second party device 110, an instruction to display the retrieved AR object. The payment network server 106 may receive, from the second party device 110, an input from the second party in relation to the AR object. The input may include one or more comments of the second party.

In an example, the payment network server 106 may provide, to the first party device 108 and the second party device 110, an instruction to set up a video conference between the first party and the second party. The payment network server 106 may provide, to the second party device 110, an instruction to display the AR object in an environment of the second party as a segment of the video conference. The second party may be remotely located from the first party.

In an example, the payment network server 106 may provide, to a video conference server 104 for a video conference, an instruction to set up a video conference between the first party and the second party. The video conference server 104 may be operationally communicable with the payment network server 106. The payment network server 106 may provide, to the second party device 108, an instruction to display the AR object in an environment of the second party as a segment of the video conference. The second party may be remotely located from the first party.

In an example, the data may include a request for payment for the selected object. The input may include an approval or a rejection for the selected object. The payment network server 106 may provide, to the second party device 110, an instruction to display an AR object and request for payment and receive, from the second party device 110, an input including an approval or a rejection to the request for payment.

In an example, the payment network server 106 may determine whether an approval from a third party is required before payment for the selected object is finalized based on pre-registered information in response to receipt of the approval of payment for the selected object from the second party.

In an example, the payment network server 106 may provide, to a third party device 112, an instruction to display the retrieved AR object and request for payment when it is determined that the approval from the third party is required. The payment network server 106 may receive, from the third party device 112, the input including the approval or the rejection of payment for the selected object from the third party in response to displaying the request for payment, In an example, the payment network server 106 may provide, to the first party device 108, the instruction to the first party to change the selection of object in response to receipt of the rejection of payment for the selected object.

In an example, the payment network server 106 may provide, to an issuer server 116, the instruction to proceed with the payment for the selected object, when it is determined that the approval from the third party is not required or the approval from the third party is received from the third party. The issuer server 116 may relate to an issuer predetermined by the second party and/or the third party.

In an example, the first party device 108 may be a device for a first party to initiate the AR object sharing. In some embodiments, a request to initiate the AR object sharing is generated in response to a transaction request to purchase a selected object. The first party device 108 may be configured to communicate with the merchant server 102, the video conference server 104 and the payment network server 106. The first party device 108 may be configured to provide data corresponding to a selection of an object. The first party device 108 may include a display to show an AR object for the AR object sharing. Examples of the first party device may include mobile phone, tablet computer, wearable device such as Head Mount Display etc.

In an example, when the first party is purchasing an object, the first party may choose whether a) pay using existing payment process or b) select a procedure to pay using a multi-user payment approval method in which an approval from a second party and/or a third party is required. On selecting b), the first party may get to add an approval flag and sign a digital invoice with a certificate of the first party device 108 to generate a digital signature as an acceptance of the digital invoice. Managing of the digital invoice may be performed by the payment network server 106.

In an example, the second party device 110 may be a device for a second party to participate in the AR object sharing initiated by the first party. The second party device 110 may be operationally coupled to the merchant server 102, the video conference server 104 and the payment network server 106 and the issuer server 116. The second party device 110 may include a display to show an AR object for the AR object sharing. The second party device 110 may be one that is managed by a user who is authorized by a holder of an account to be used in a transaction, for example, a supplementary card holder. In various embodiments, the second party device that is configured to approve or refuse a transaction of a selection of AR objects. Examples of the second party device may include mobile phone, tablet computer, wearable device such as Head Mount Display etc.

In an example, the third party device 112 may be a device for a third party to participate in the AR object sharing. The third party device 112 may be operationally coupled to the merchant server 102, the video conference server 104 and the payment network server 106 and the issuer server 116. The third party device 112 may include a display to show an AR object for the AR object sharing.

In an example, the acquirer server 114 may be a server relating to an acquirer for facilitating payment to the merchant. The acquirer server 114 may be operationally coupled to the merchant server 102 and the payment network server 106.

In an example, the issuer server 116 may be a server relating to an issuer for facilitating payment between the first party and the merchant. That is, the issuer is one which issues or manages an account to be used in a transaction between the first party and the merchant. In an embodiment, the first party may not be a holder (or owner) of the account. In another embodiment, the first party may not be the holder of the account but is one who is authorised to use the account by the rightful holder (e.g. the second party or the third party). In various embodiments, the issuer server is one that may send an authorisation response to a transaction request, to authorise or not to authorise the transaction request. The issuer server 116 may be operationally coupled to at least one of the payment network server 106, the second party device 110 and the third party device 112.

Figure 1B:
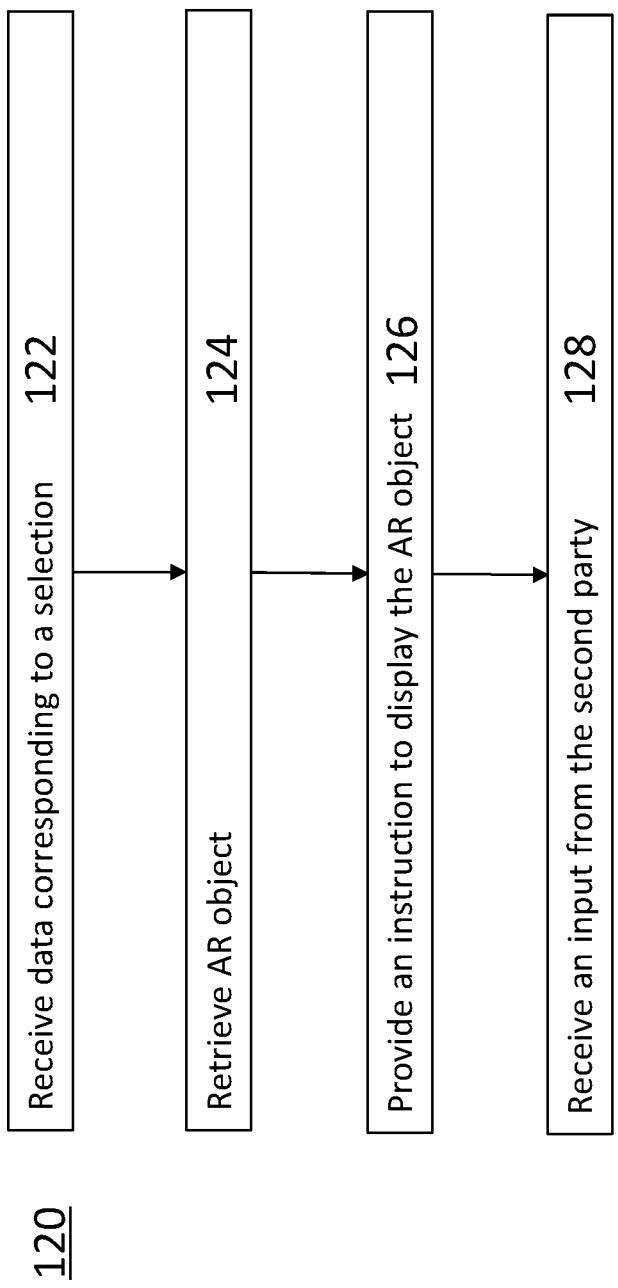
FIG. 1B shows a flow diagram illustrating a method enabling AR object sharing according to various embodiments.

FIG. 1B shows a flow diagram 120 illustrating a method for enabling an AR object sharing according to various embodiments. The method 120 includes at least the steps of:
- receiving, from a first party device, data corresponding to a selection of an object by the first party; (step 122)
- retrieving, from a database operationally coupled with the server, an AR object relating to the received data in response to the receipt of the data; (step 124)
- providing, to the second party device, an instruction to display the retrieved AR object; (step 126) and
- receiving, from the second party device, an input from the second party in relation to the AR object, the input comprising one or more comments of the second party (step 128).

In step 122, the data, from a first party device, corresponding to the selection of the object by the first party may be received from the first party device. Alternatively, the data corresponding to the selection of the object by the first party may be forwarded by a merchant server in response to receiving, from the first party device, the selection of the object by the first party. The data may indicate a location of an AR object corresponding to the selected object in a database. The data may be shown in a format of QR code near an object at a physical store and obtained by the first party device using a scanner of the first party device. Alternatively, the data may be shown in an E-commerce store and obtained by selecting an object at the E-commerce store using the first party device. The obtained data may be received by a server for retrieving an AR object in step 124. In step 122, the data may be received in response to a transaction request.

In an example, the merchant server may have an AR object corresponding to an object with the link of the same added as a QR code. The QR code may be made available on or near the object inside the physical store. Alternatively, the first party device has a software application to extract and process the 3D-version of the physical object using the in-built camera in the first party device.

In step 124, the AR object relating to the received data may be retrieved from a database, in response to the receipt of the data, operationally coupled with the server. The AR object may be a two-dimensional object or a three-dimensional object created by a computer-aided design (CAD) tool or a combination of several photographs. Alternatively, the AR object may be created by one or more sensors with a software application of the first party device. The AR object may be generated by a video conference server or a payment network server and stored in a database.

In step 126, the instruction to display the retrieved AR object may be provided to the second party device so that the second party can see the retrieved AR object. In an example, there may be an option for the second party to select whether or not accept the instruction to display the AR object. For example, the second party may refuse the instruction to display the AR object because Internet connectivity for the second party device is not sufficiently good enough to display the AR object. The AR object may be displayed without any background. Alternatively, the AR object may be displayed in an environment of the second party. The environment of the second party can be captured by a camera of the second party device. Alternatively, the environment of the second party can be seen through a transparent display of the second party device.

In an example, an instruction is provided to the first party device and the second party device to set up a video conference between the first party and the second party. Alternatively, an instruction is provided to a video conference server for a video conference to set up a video conference between the first party and the second party. Furthermore, an instruction may be provided to the second party to display the AR object in an environment of the second party as a segment of the video conference. In an example, the second party may be remotely located from the first party. In an example, a link to location of AR object may be added to optional field of VP8 codec of the video conference and the AR object may be retrievable from the location of the link.

In step 126, it is mentioned that the second party may refuse the display of the AR object. In step 128, the input from the second party in relation to the AR object may be received from the second party device. The input may include one or more comments of the second party. For example, the second party may be able to provide one or more comments on a specific part of the AR object in a real time manner. That is, the comments may be displayed as an overlay or a different layer on the AR object. By providing an arrow, an indicator, a label or one or more comments on the specific part of the AR object, the first party can understand the intention of the second party easily and clearly without delay. Furthermore, the second party may adjust a location of the AR object in the environment of the second party and share the location of the AR object by using coordinate information as an input. In an example, the AR object may be transferred using VP8 codec and the coordinates of the AR object may be added to an optional portion of VP8 codec frame and sent out to the first party. Also, the optional portion of VP8 may be used for annotations such as text, arrows or any other types of indications on the screen meant to be transferred in the same way as the AR object.

The shape of the AR object may not necessarily reflect the shape of an actual object. In an example, an object which the first party wishes to purchase may be a seed of a plant and the AR object to be shared with the second party may be a grown plant of the seed so that the second party may provide comments on the AR object of the grown plant.

The input from the second party in relation to the AR object may include various types of input. In an example, the first party may be a trainee of a sport and the second party may be a trainer of the sport. The AR object may be a three dimensional model of the first party playing the sport e.g. a golf. By reviewing the AR object, the second party may point out and fix a posture of the AR object if it is not appropriate, which enables a remote personal training. Receiving the AR object and providing to the first party with a feedback in relation to the AR object in a real time manner may significantly enhance experiences for the first party and the second party because it enables to conduct training as if the first party and the second party are in the same location. The feedback in relation to the AR object may include one or more comments on a specific point in the AR object, which is clear for the one who give the feedback and the one who receive the feedback.

Similarly, the AR object may be the first party playing a piano or doing a surgical training and the second party who is a mentor of the first party provide the first party with inputs such as points to be fixed. The AR object may be a three dimensional movie such that the second party may playback and pose the movement of the AR object and provides with feedbacks to the first party.

In an example, the first party and the second party may be in a reservation process for a hotel room, a flight ticket, a train ticket or a concert ticket. In an example, the first party may wish to share an AR object of an entire hotel together with an indication of available room and the AR object may be displayed on the second party device so that the second party may select a preferred room in the hotel. Similarly, the first party may wish to share an AR object of seating plan for flight, train and concert together with an indication of available seat and the AR object may be displayed on the second party device so that the second party may select a preferred seat in the flight, the train and the concert. By sharing the AR object, even if the first party and the second party are remotely located, they may discuss the reservation as if they are at the same location.

In an example, the AR object sharing may be performed by a family. For example, a first party may be a son, a second party may be a mother and a third party may be a father. On a video conference or any multi-user communication means, when one or any of the parties decide to make a purchase, the bank at the payment gateway stage can pass the payment authentication to leading member of the family in a stagewise approach. A payment may be authorised only after successful authentication by more than single user in the communication chain.

For example, the son decides to purchase an item from e-commerce store or offline store on an AR collaboration platform. On proceeding to buy the item, the Son communicating with Father and Mother is able to send real-time request for authentication to Father and/or Mother. The video interface is able to facilitate biometrics authentication (either face, voice or fingerprint or retinal or any other) of the parent (or either of the parent). Accordingly a group user may be able to authenticate payment.

In scenarios, where issuers/banks are interested in enhanced security for family shopping or allow shopping for minors only on the approved of majors, this method of multi-user payment authentication on real-time communication platform is useful.

The method for enabling an AR object sharing as discussed with reference to FIG. 1B may be performed in a server for AR object sharing. For example, the method may be performed in any one of the merchant server 102, the video conference server 104 and the payment network server 106 of FIG. 1A.

Figure 2B:
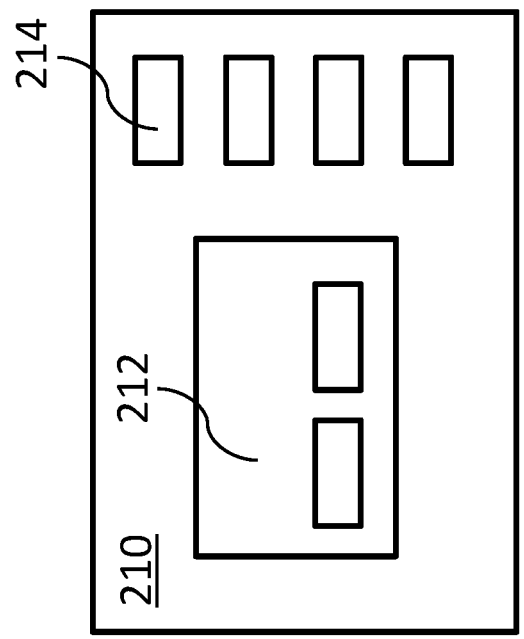
FIG. 2B shows a screen of a second party device receiving a request for the AR object sharing from the first party according to various embodiments.
Figure 2A:
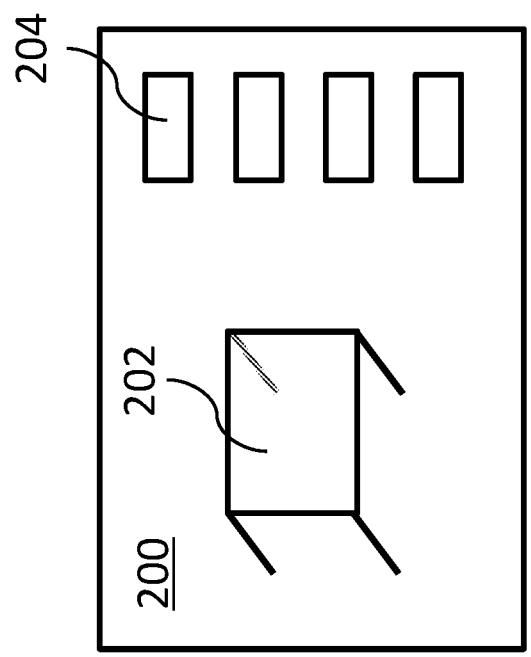
FIG. 2A shows a screen of a first party device initiating an AR object sharing according to various embodiments.

FIG. 2A shows a screen 200 of a first party device initiating an AR object sharing according to various embodiments. In an example, the screen 200 may show an AR object 202, e.g. a table, and menu buttons 204. The background of the screen 200 may be blank or an environment of the first party captured by an image capturing device of the first party device. One of the menu buttons 204 may be an option to activate sharing the AR object 202 to the other party e.g. a second party. The screen may be a display of a mobile phone, a table computer or a head mount display. In an example, to initiate the AR object sharing, the first party device may send a request to show the AR object of a selected object via e-commerce website or a QR code located near the selected object.

FIG. 2B shows a screen 210 of a second party device receiving a request for the AR object sharing from the first party according to an embodiment where the first party is seeking for approval of purchasing an object from the second party. In an example, the screen 210 may show a dialog 212 to ask whether the second party accepts the request for the AR object sharing. The AR object may select "yes" or "no" to the dialog. The screen 210 may also show menu buttons 214 similar to the menu buttons 204 shown in FIG. 2A. The second party may configure, whether the dialog 212 will be shown, in advance. If the second party does not want to see the dialog 212 to expedite the procedure, the dialog 212 may not be shown and the AR object from the first party device is shared directly to the second party device.

Figure 3:
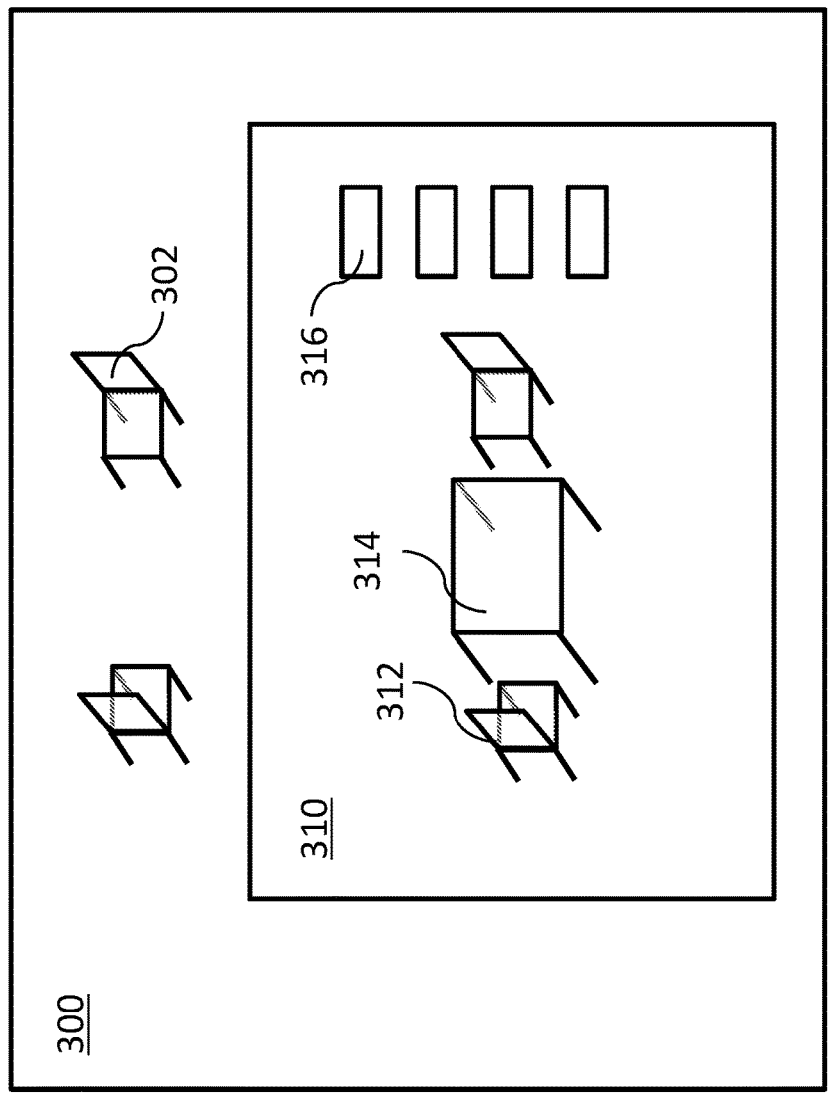
FIG. 3 shows a second party environment and a screen of a second party device displaying an AR object in the second party environment according to various embodiments.

FIG. 3 shows a second party environment 300 and a screen 310 of a second party device displaying an AR object 314 in the second party environment according to various embodiments. When the second party accepts the request for the AR object sharing, the AR object 314 received from the first party may be shown on the screen 310. In an example, the environment of the second party includes one or more objects 302 e.g. a chair. The screen 310 shows the one or more objects 312 together with the AR object 314 as if the AR object is in the environment of the second party. In an example, the second party may share the information of the screen 310 to the first party by using at least one of the menu buttons 316.

In an example, the current coordinates of the AR image such as (x1, y1), (x2, y2), (x3, y3) and (x4, y4) in the environment of the second party may be obtained and shared with the first party. In an example, the AR object sharing uses VP8 codec and the coordinate date may be included in optional portions of VP8 codec and shared together with the AR object.

Figure 4:
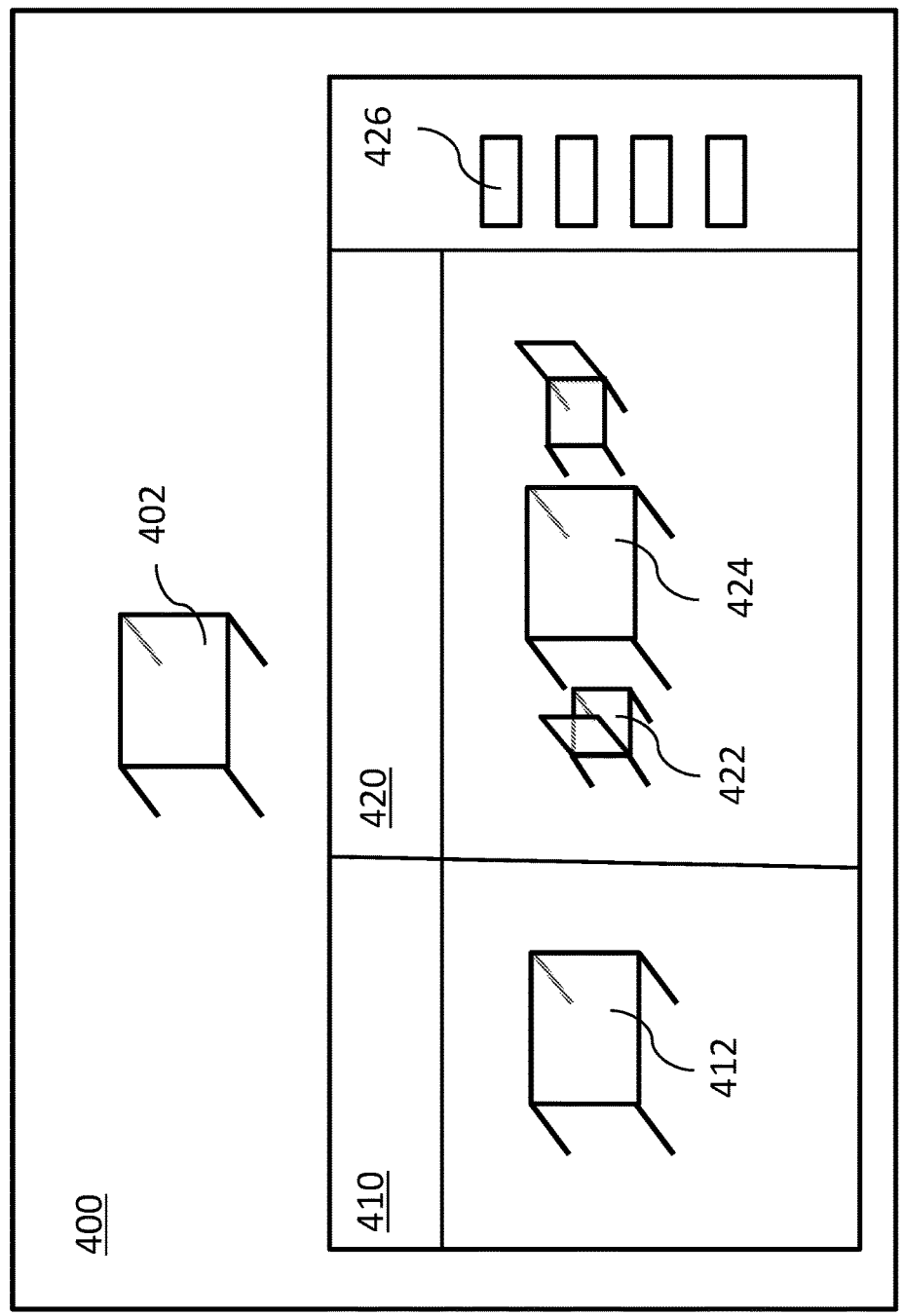
FIG. 4 shows a first party environment and a screen of a first party device displaying an AR object in the first party environment and a second party environment according to various embodiments.

FIG. 4 shows a first party environment 400 and a screen of a first party device displaying an AR object in the first party environment 410 and a second party environment 420 according to various embodiments. When the second party shares the information of the screen 310 of FIG. 3 to the first party, the first party can see the information in the screen 420. In an example, the environment of the second party includes one or more objects 422 e.g. a chair together with the AR object 424. In an example, the first party may provide an input on the AR object 424 by using the menu buttons 426. Accordingly, the first party and the second party can collaborate in real-time and review the AR object in the environment of the second party.

Figure 5A:
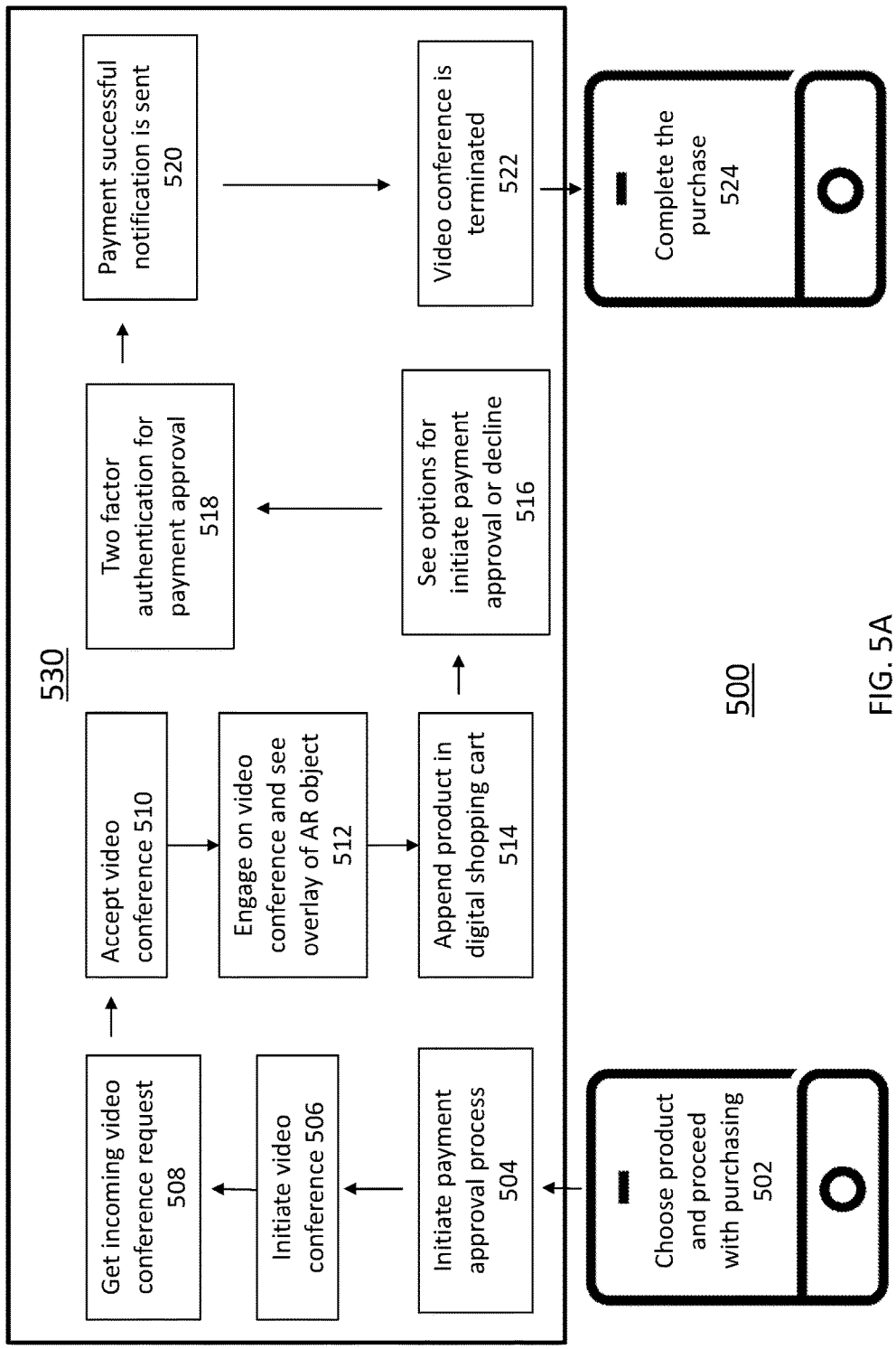
FIG. 5A shows an exemplary flow enabling AR object sharing in a server together with a first party device according to various embodiments.

FIG. 5A shows an exemplary flow 500 enabling AR object sharing in a server together with a first party device according to various embodiments. Steps 502 and 524 are performed in the first party device. Other steps (504, 506, 508, 510, 512, 514, 516, 518, 520 and 522) may be performed in a payment approval platform 530. The payment approval platform 530 may correspond to the video conference server 104 and the payment network server 106 of FIG. 1A. That is, the steps that are shown in the payment approval platform 530 are processes that may be performed by the video conference server 104 and the payment network server 106 of FIG. 1A.

In step 502, a first party (such as a primary shopper) may choose a product (which may then be represented in two dimensional or three dimensional AR image object) and proceed with purchasing of the product at a physical store or E-commerce store. Based on the products dropped in the digital shopping cart, a digital invoice (DI) may be generated. The structure of DI may be discussed with reference to FIG. 7. The generated DI may identify all the involved merchants and timestamp of the transaction when the first party is purchasing products from one or more merchants in the same E-commerce store.

In step 504, a merchant server or a payment network server may initiate a payment approval process at checkout in response to an addition of the product to the digital shopping cart. The generated DI may be forwarded to the first party for review in the first party device. When the first party may be satisfied with the offer indicated in DI, the first party may choose whether to a) pay using existing payment process or b) select a procedure to pay using a multi-user payment approval method in which an approval from a second party and/or a third party is required. On selecting b), the first party may get to add an approval flag and sign the DI with his/her device certificate to generate a digital signature as an acceptance of the DI.

In step 506, the first party device may initiate a video conference with the second party. Alternatively, the first party device may initiate a video conference with the second party and the third party. The video conference may be performed using an in-built video conference interface. Alternatively, the video conference may be performed using other video conference interface by connecting through an application programming interface or a software plugin which is explained as with reference to FIG. 6A to 6C.

In step 508, the second party may get incoming video conference request from the first party citing request for payment approval. In step 510, the second party may accept the video conference. If the first party and the second party were already live on the in-built video conference interface or other video conference interface, the second party may receive a message-overlay on the active video conference screen seeking attention.

In step 512, the second party may engage on the video conference with the first party and see an overlay of an AR object of a product in a digital shopping cart in which approval is requested. The second party may be requested to review and sign the DI signed by the first party.

In step 514, the second party can choose to append the product in the digital shopping cart for purchase before proceeding for payment approval. In step 516, the second party may see options for initiate payment approval or decline. The second party may have an option to communicate with the first party on the video conference to individually select/deselect any/all items sent to the second party for payment approval including project an AR object from the list in his/her vicinity and experience/review. In case there are changes agreed between the first party and the second party on the items in the digital shopping cart and therefore a need for a new DI is sought, the first party may initiate to arrange the new DI.

In step 518, on initiating payment approval, the payment approval platform 30 may initiate two-factor authentication (2FA) including any (or all) of the following identity approval methods a) biometrics recognition of the second party and b) PIN authentication. After completing the 2FA process by the second party, the details of the second party may be added to the DI and digitally signed with the second party's certificate. Optionally, it is determined that a payment channel (based on card details used or bank account used for bank-pay transfer or digital wallet or any other) has an additional approver such as a third party in addition to the second party, an approval request for the DI to the third party may be triggered. The detailed procedures which require approval from both the second party and the third party will be discussed with reference to FIG. 5B.

In step 520, on successful payment approval by the second party, the first party and the merchant may get payment success notification. In step 522, video conference can be terminated by either of the first party or the second party at any time. Merchant may acknowledge the receipt of payment and instruct a POS device at a physical store to deliver the product to the first party. Alternatively, the merchant may instruct to proceed with shipment of a product selected in E-commerce store to the first party. In step 524, the first party may complete the purchase procedures.

Figure 5B:
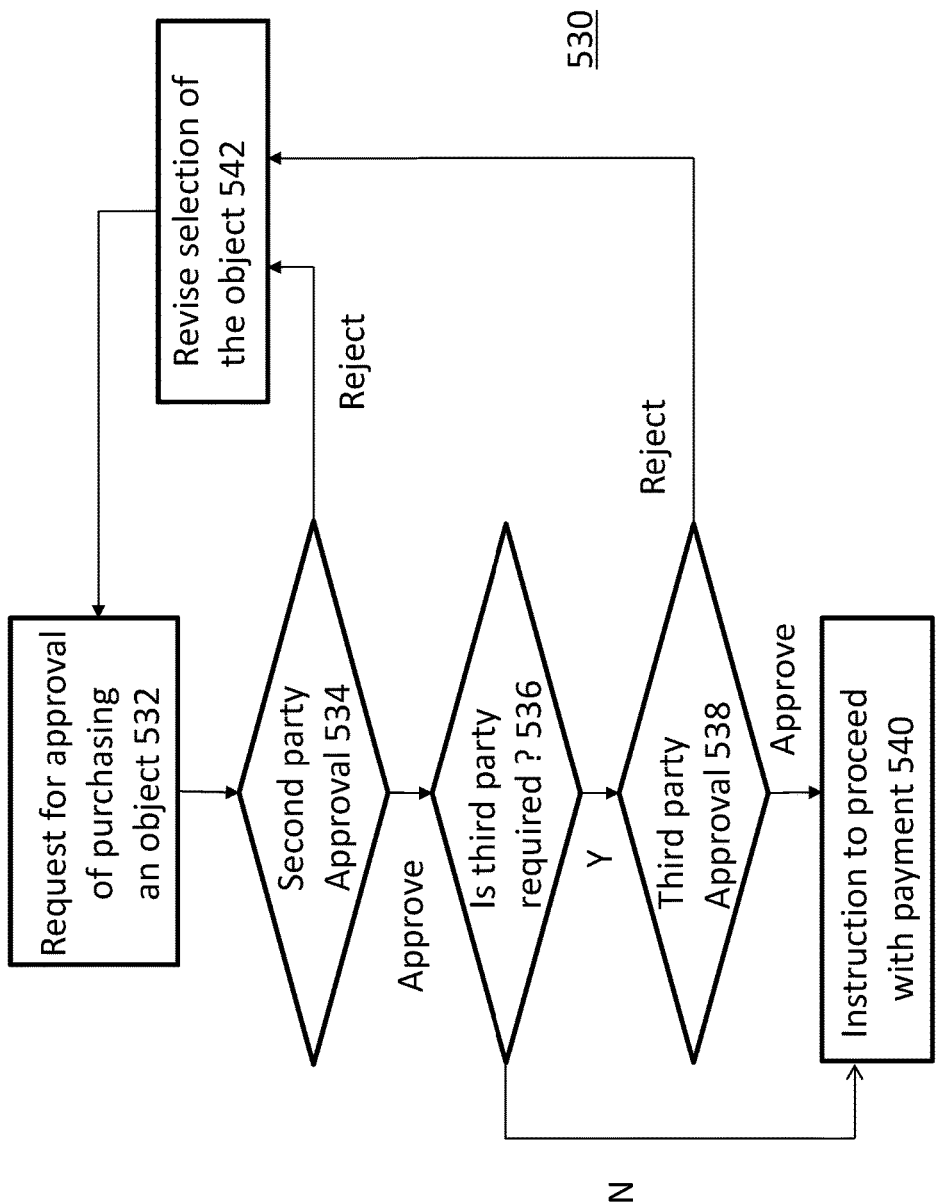
FIG. 5B shows an exemplary flow for receiving payment approval for an object relating to an AR object from one or more parties according to various embodiments.

FIG. 5B shows an exemplary flow 530 for receiving payment approval for an object relating to an AR object from one or more parties according to various embodiments. In step 532, a first party may send a request to a second party for approval of purchasing an object.

In step 534, the second party may determine whether approve or reject of payment for the selected object in response to the request from the first party.

When the second party approves the payment for the selected object, it is determined that whether an approval from a third party is required before payment for the selected object is finalized based on a pre-registered information in step 536. When the second party rejects the payment for the selected object, the first party may be requested to revise the selection of the object in step 542.

When it is determined that an approval from the third party is required before payment for the selected object is finalized based on the pre-registered information, the third party may determine whether approve or reject of payment for the selected object in step 538. When the third party rejects the payment for the selected object, the first party may be requested to revise the selection of the object in step 542. When the first party wishes to request for approval again, the process will start from step 532 again.

In an example, there may be an option when the third party rejects the payment for the selected object. For example, the second party may take responsibility for the payment for the selected object and proceed with the payment without receiving an approval from the third party.

When it is determined that the approval from the third party is not required or the approval from the third party is received from the third party, an instruction is sent to an issuer server to proceed with the payment for the selected object, the issuer server may relate to an issuer predetermined by the second party and/or the third party in step 540.

Figure 6A:
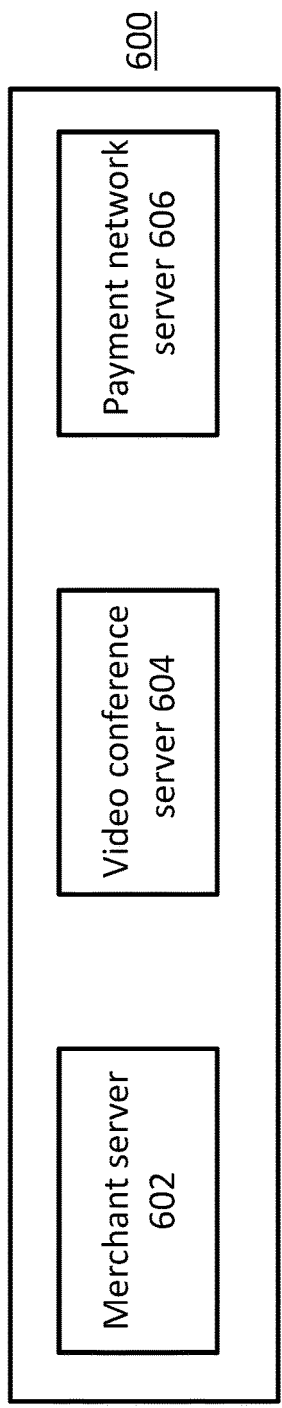
FIG. 6A to 6C show three exemplary scenarios enabling AR object sharing according to various embodiments.
Figure 6B:
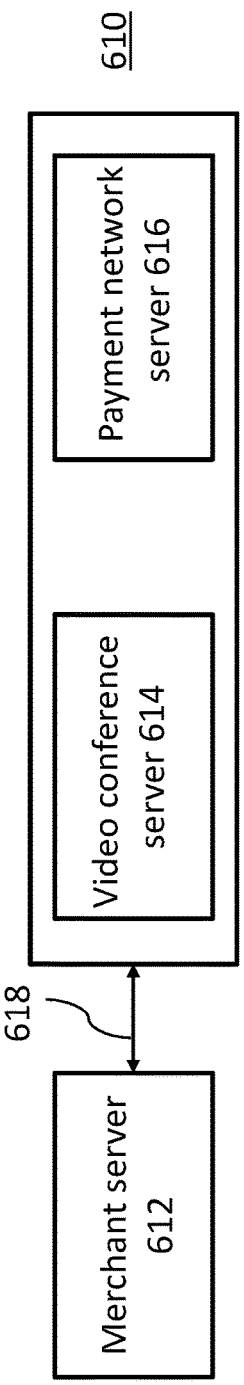
Figure 6C:
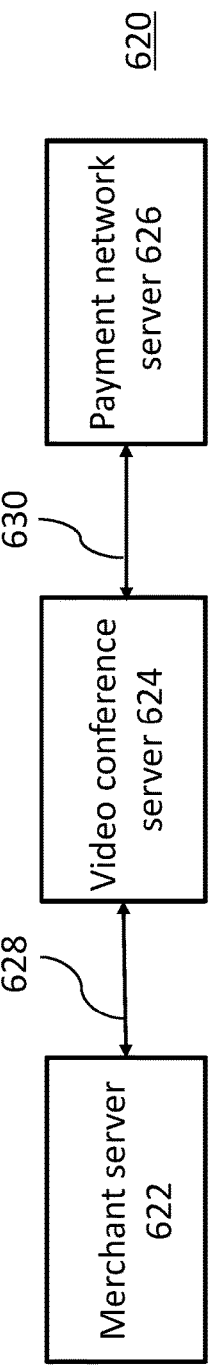

FIG. 6A to 6C show three exemplary scenarios enabling AR object sharing according to various embodiments. FIG. 6A shows an exemplary closed loop scenario 600. In the exemplary closed loop scenario 600, a merchant server 602, a video conference server 604 and a payment network server 606 may be within the same network and sharing information regarding a first party device and a second handled by the same entity.

FIG. 6B shows an exemplary hybrid loop scenario 610. In the exemplary hybrid loop scenario 610 shows a merchant server 612, a video conference server 614 and a payment network server 616. In an example, the merchant server 612 may be handled by an entity and the video conference server 614 and the payment network server 616 are handled by the other entity. Through an application programming interface or software installable on the server as shown in 618, communication between the merchant server 612 and the video conference server 614 and/or the payment network server 616 are established in a secure manner.

FIG. 6C shows an exemplary open loop scenario 620. In the exemplary open loop scenario 620 shows a merchant server 622, a video conference server 624 and a payment network server 626. In an example, the merchant server 622 may be handled by an entity and the video conference server 624 may be handled by another entity. The payment network server 626 may be handled by yet another entity. Through an application programming interface or a software plugin as shown in 628 and 630, communications between the merchant server 622, the video conference server 624 and the payment network server 626 are established in a secure manner.

With the exemplary open loop scenario 620, several options are available for the first party and the second party to choose merchant store, video conference channel and payment network server, which provides significant flexibility for the first party and the second party because the first party and the second party can choose tools which they are familiar with. In an example, the AR sharing may be compatible with several merchant stores, video conference channels and payment network servers and various combination of the tools are available for the first party and the second party.

Figure 7:
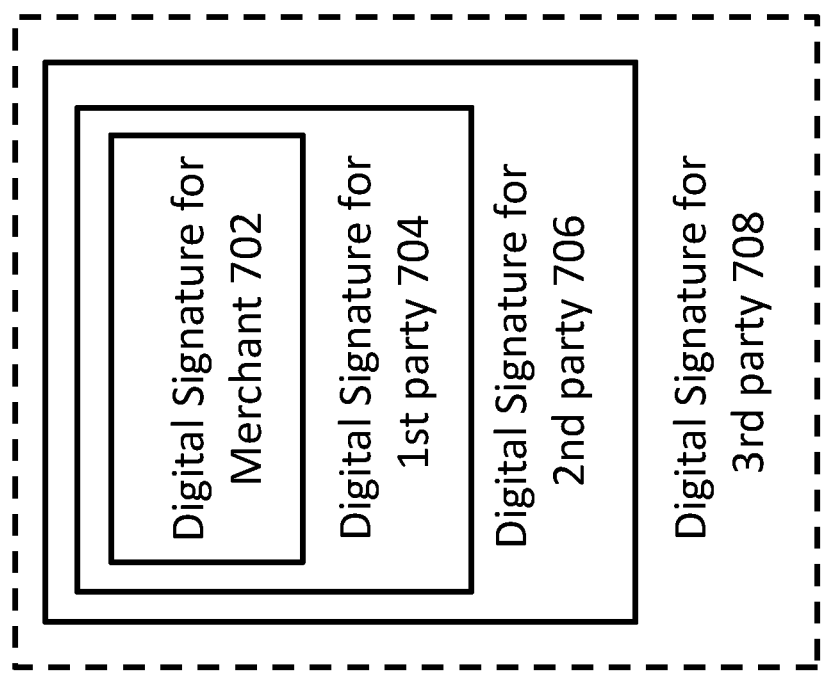
FIG. 7 shows an exemplary digital invoice for use in the exemplary flow of FIGS. 5A and 5B according to various embodiments.

FIG. 7 shows an exemplary digital invoice (DI) 700 for use in the exemplary flow of FIGS. 5A and 5B according to various embodiments. The exemplary DI 700 may be generated, by the payment network server, for the purpose of facilitating payment approval. The exemplary DI may include digital signature for a merchant at 702, digital signature for a first party at 704, digital signature for a second party at 706, and optionally digital signature for a third party at 708. The amount to be paid for the DI may be included at 702 and if there is change in the amount to be paid, the DI may be re-generated.

As discussed with reference to FIG. 5A and FIG. 5B, digital signature for each party may be added to the DI as the payment approval process proceeds. As the DI corresponds to the payment approval process, the DI will advantageously facilitate the understanding of the status of the payment approval process. In an example, the generation and update of the DI may be facilitated by a payment network server. By receiving input from a merchant server, a first party device, a second party device and optionally a third party device, the DI may be generated and updated. In an example, the generation and update of the DI may be processed in backend of a system and may not be displayed to the first party and/or the second party.

Figure 8:
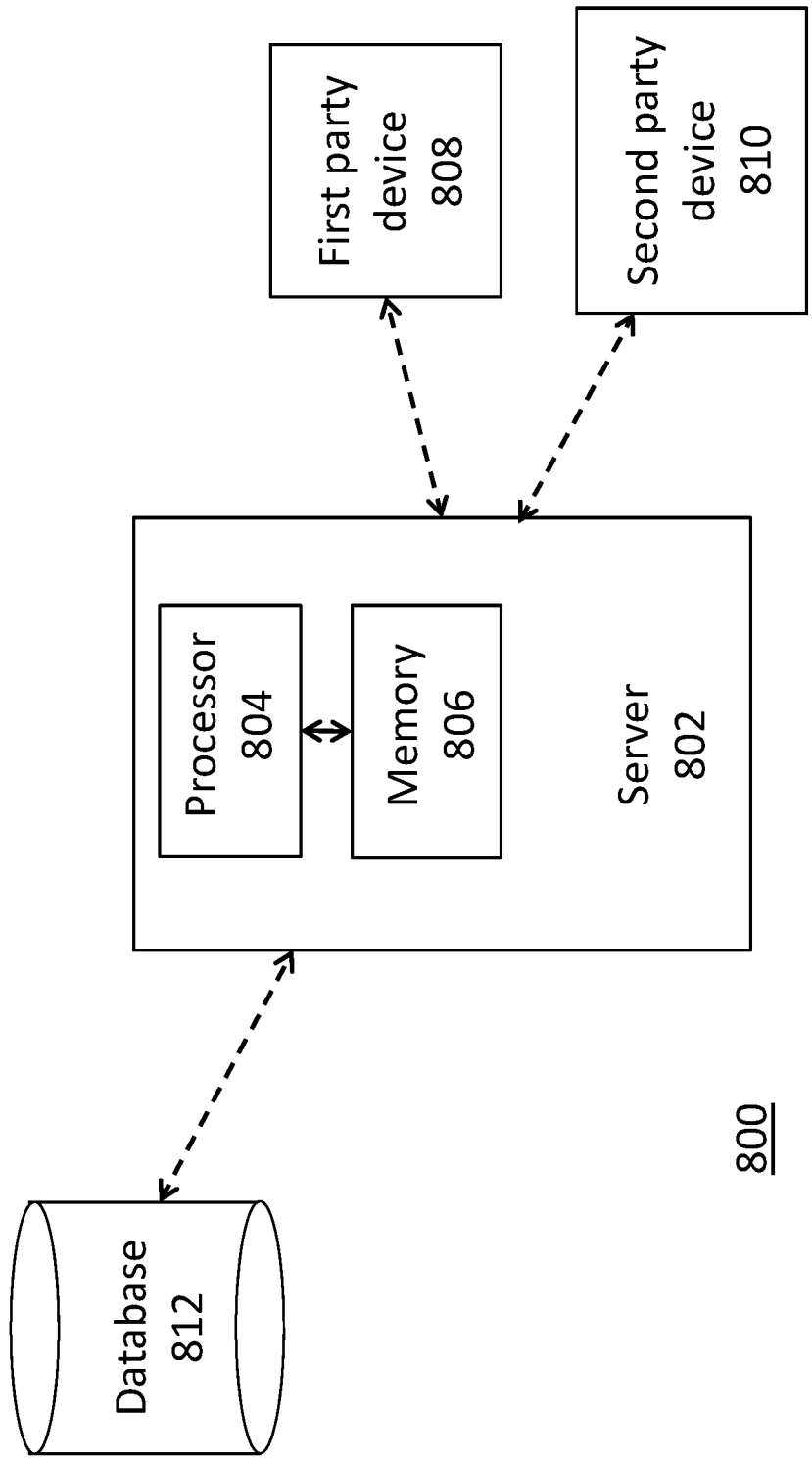
FIG. 8 shows an exemplary server enabling AR object sharing according to various embodiments.

FIG. 8 shows an exemplary block diagram 800 of a server 802 enabling AR object sharing according to various embodiments. There is provided a server 802 enabling AR object sharing between a first party and a second party. The server 802 includes at least one processor 804, and at least one memory 806 including computer program code. The at least one memory 806 and the computer program code configured to, with the at least one processor 804, cause the server 802 at least to receive, from a first party device 808, data corresponding to a selection of an object by the first party, retrieve, from a database 812 operationally coupled with the server 802, an AR object relating to the received data in response to the receipt of the data, provide, to the second party device 810, an instruction to display the retrieved AR object, and receive, from the second party device 810, an input from the second party in relation to the AR object, the input including one or more comments of the second party.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "receiving", "providing", "retrieving", "determining", "generating" or the like, refer to the action and processes of a computer system, or similar electronic device, that manipulates and transforms data represented as physical quantities within the computer system into other data similarly represented as physical quantities within the computer system or other information storage, transmission or display devices.

Figure 9:
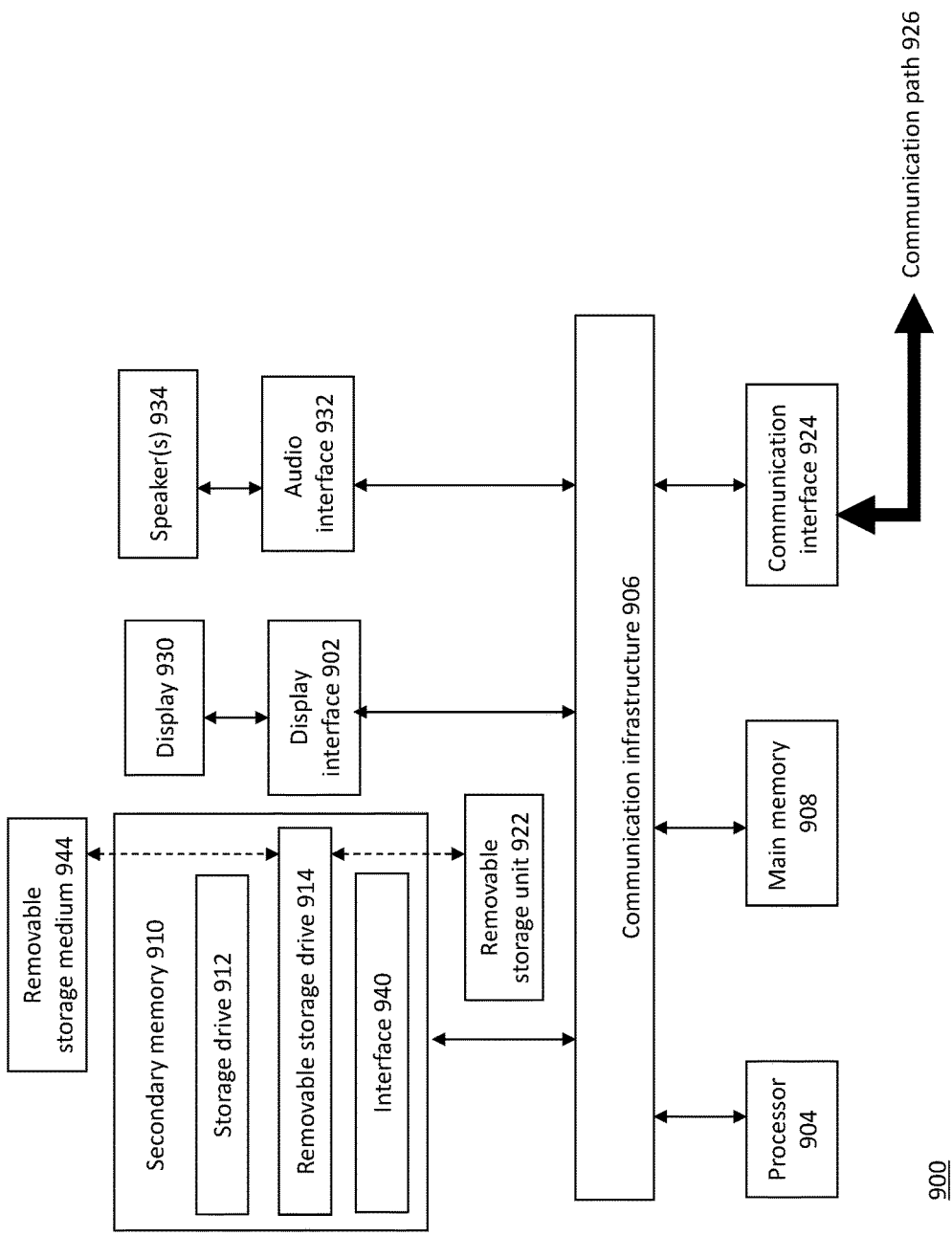
FIG. 9 shows an exemplary server enabling AR object sharing according to various embodiments.

FIG. 9 depicts an exemplary computing device 900, hereinafter interchangeably referred to as a computer system 900 or as a server 900, where one or more such computing devices 900 may be used to implement the merchant server 102, video conference server 104 and payment network server 106 shown in FIG. 1A. The following description of the computing device 900 is provided by way of example only and is not intended to be limiting.

As shown in FIG. 9, the example computing device 900 includes a processor 904 for executing software routines. Although a single processor is shown for the sake of clarity, the computing device 900 may also include a multi-processor system. The processor 904 is connected to a communication infrastructure 906 for communication with other components of the computing device 900. The communication infrastructure 906 may include, for example, a communications bus, cross-bar, or network.

The computing device 900 further includes a main memory 908, such as a random access memory (RAM), and a secondary memory 910. The secondary memory 910 may include, for example, a storage drive 912, which may be a hard disk drive, a solid state drive or a hybrid drive and/or a removable storage drive 914, which may include a magnetic tape drive, an optical disk drive, a solid state storage drive (such as a USB flash drive, a flash memory device, a solid state drive or a memory card), or the like. The removable storage drive 914 reads from and/or writes to a removable storage medium 944 in a well-known manner. The removable storage medium 944 may include magnetic tape, optical disk, non-volatile memory storage medium, or the like, which is read by and written to by removable storage drive 914. As will be appreciated by persons skilled in the relevant art(s), the removable storage medium 944 includes a computer readable storage medium having stored therein computer executable program code instructions and/or data.

The computing device 900 also includes at least one communication interface 624. The communication interface 924 allows software and data to be transferred between computing device 900 and external devices via a communication path 926. In various embodiments of the inventions, the communication interface 924 permits data to be transferred between the computing device 900 and a data communication network, such as a public data or private data communication network. The communication interface 924 may be used to exchange data between different computing devices 900 which such computing devices 900 form part an interconnected computer network. Examples of a communication interface 924 can include a modem, a network interface (such as an Ethernet card), a communication port (such as a serial, parallel, printer, GPIB, IEEE 1394, RJ45, USB), an antenna with associated circuitry and the like. The communication interface 924 may be wired or may be wireless. Software and data transferred via the communication interface 924 are in the form of signals which can be electronic, electromagnetic, optical or other signals capable of being received by communication interface 924. These signals are provided to the communication interface via the communication path 926.

As shown in FIG. 9, the computing device 900 further includes a display interface 902 which performs operations for rendering images to an associated display 930 and an audio interface 932 for performing operations for playing audio content via associated speaker(s) 934.

As used herein, the term "computer program product" (or computer readable medium, which may be a non-transitory computer readable medium) may refer, in part, to removable storage medium 944, removable storage unit 922, a hard disk installed in storage drive 912, or a carrier wave carrying software over communication path 926 (wireless link or cable) to communication interface 924. Computer readable storage media (or computer readable media) refers to any non-transitory, non-volatile tangible storage medium that provides recorded instructions and/or data to the computing device 900 for execution and/or processing. Examples of such storage media include magnetic tape, CD-ROM, DVD, Blu-ray™ Disc, a hard disk drive, a ROM or integrated circuit, a solid state storage drive (such as a USB flash drive, a flash memory device, a solid state drive or a memory card), a hybrid drive, a magneto-optical disk, or a computer readable card such as a PCMCIA card and the like, whether or not such devices are internal or external of the computing device 900. Examples of transitory or non-tangible computer readable transmission media that may also participate in the provision of software, application programs, instructions and/or data to the computing device 900 include radio or infra-red transmission channels as well as a network connection to another computer or networked device, and the Internet or Intranets including e-mail transmissions and information recorded on Websites and the like.

The computer programs (also called computer program code) are stored in main memory 908 and/or secondary memory 910. Computer programs can also be received via the communication interface 924. Such computer programs, when executed, enable the computing device 900 to perform one or more features of embodiments discussed herein. In various embodiments, the computer programs, when executed, enable the processor 904 to perform features of the above-described embodiments. Accordingly, such computer programs represent controllers of the computer system 900.

It is to be understood that the embodiment of FIG. 9 is presented merely by way of example. Therefore, in some embodiments one or more features of the computing device 900 may be omitted. Also, in some embodiments, one or more features of the computing device 900 may be combined together. Additionally, in some embodiments, one or more features of the computing device 900 may be split into one or more component parts. The main memory 908 and/or the secondary memory 910 may serve(s) as the memory for the server 102, 104, 106 of FIG. 1A; while the processor 904 may serve as the processor of the server 102, 104, 106 of FIG. 1A.

The present specification also discloses servers for performing the operations of the methods. Such servers may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a computer effectively results in a server that implements the steps of the preferred method.

FIG. 10A shows a flow diagram 1000 illustrating a method for seeking authentication for payment in relation to an Augmented Reality (AR) object sharing between a first party and a second party. At step 1002, the method includes receiving an input from the first party regarding the selection of the object. The input may include moving a selected object to a shopping cart in an online shopping website. In an example, the method may include displaying an AR object regarding the selection of the object so that the first party can review the AR object before purchasing of the object. In an example, the first party may have an option to buy the selected object by himself or seek for approval of payment from the second party.

At step 1004, the method includes receiving a request, from the first party, identifying the second party and requesting the second party for approval of payment for the selected object. Once the first party may choose to seek for authentication for payment from the second party, the first party may request the second party for approval of the payment. In an example, the first party device may receive the request from the first party and identify the second party who is able to approve the payment and send a request for approval to the second party.

At step 1006, the method includes receiving, from a server, an authentication result of a determination of whether the second party approves the payment for the selected object. The method may further include receiving, from the server, an input from the second party in relation to the AR object. The input may include one or more comments. The one or more comments may include requests or suggestions from the second party. The method may further include displaying the authentication result to the first party in response to receiving the authentication result of the determination of approval or not of payment for the selected object.

If the second party authenticates the payment for the selected object, the step 1008 is performed. At step 1008, the method may further include displaying an option to identify an additional party e.g. a third party and request the third party to approve payment for the selected object. Similar to the step of seeking approval from the second party, a selection of an object and a request for approval of payment are sent to the third party, if the approval from the third party is required.

If the second party does not authenticate the payment for the selected object, the step 1010 is performed. At step 1010, the method may include displaying an option for the first party to revise the selection of the object. The method may further include displaying the AR object for the first party to review the AR object in response to receiving comments or suggestions from the second party. Once the first party revise the selection of the object and wishes to request for approval of payment again, the step 1002 may be performed.

Figure 10B:
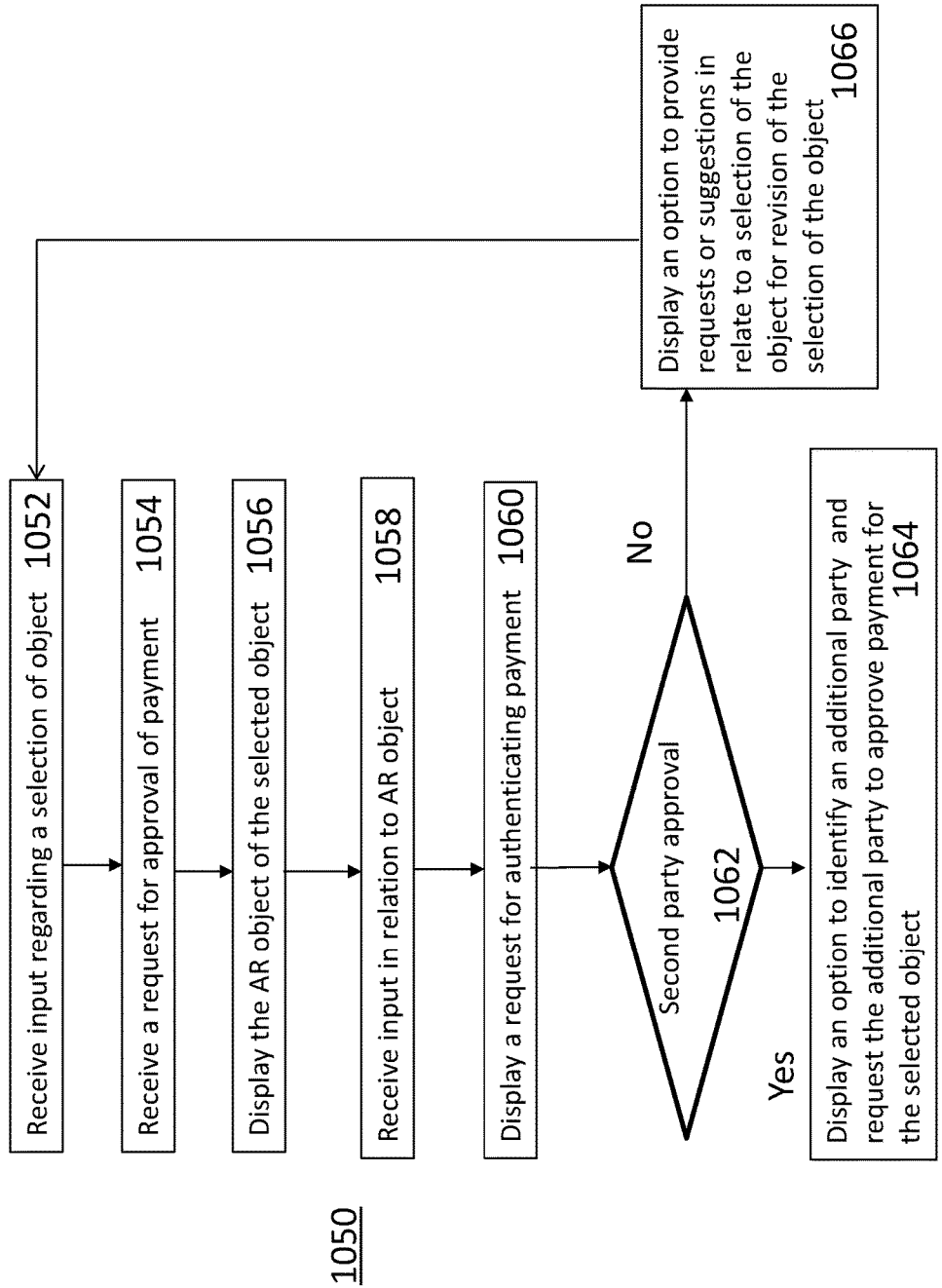
FIG. 10B shows a flow diagram illustrating a method for providing an authentication for payment in relation to an AR object sharing between a first party and a second party according to various embodiments.

FIG. 10B shows a flow diagram 1050 illustrating a method for providing authentication for payment in relate to an AR object sharing. At step 1052, the method includes receiving, from a server, an input regarding a selection of an object by the first party. At step 1054, the method further includes receiving, from a server, a request for approval of payment from the first party. At step 1056, the method further includes displaying an AR object in relate to a selection of an object by the first party. At step 1058, the method includes receiving an input from the second party in relation to an AR object regarding a selection by the first party. The input includes one or more comments of the second party.

At step 1060, the method further includes displaying a request for authenticating payment for the selected object in response to a request from the first party. In an example, the method may include displaying an option to approve or not the payment for the selected object in response to a request from the first party. In an example, the method may include requesting a two-phase authentication for the second party to verify that the second party is the one who is able to approve the payment. At step 1062, the method includes receiving an input from the second party regarding whether or not the second party approves the payment for the selected object. In an example, the second party device may receive an input from the second party regarding an authentication for payment for the selected object.

If the second party authenticates the payment for the selected object, the step 1064 is performed. At step 1064, the method further includes displaying an option to identify an additional party such as a third party and request the additional party to approve payment for the selected object. Similar to the step of seeking approval from the second party, a selection of an object and a request for approval of payment are sent to the additional party such as a third party, if the approval from the additional party such as a third party is required.

If the second party does not authenticate the payment for the selected object, the step 1066 is performed. At step 1066, the method further includes displaying an option to provide one or more comments in relation to the AR object in relate to a selection of an object by the first party in response to receiving the authentication result of rejection of payment for the selected object. The one or more comments may include requests or suggestions from the second party so that the first party may revise the selection of the object in view of the requests or suggestions.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

What is claimed is:

1. A server enabling Augmented Reality (AR) object sharing between a first party and a second party, the server comprising:
    at least one processor; and
    at least one memory including computer program code, the at least one memory and the computer program code configured to, with the at least one processor, cause the server at least to:
        receive, from a first party device, data corresponding to a selection of an object by the first party;
        retrieve, from a database operationally coupled with the server, an AR object relating to the received data in response to the receipt of the data;
        provide, to the second party device, an instruction to display the retrieved AR object;
        receive, from the second party device, an input from the second party in relation to the AR object, the input comprising one or more comments of the second party;
        provide, to the first party device and the second party device, an instruction to set up a video conference between the first party and the second party; and
        provide, to the second party device, an instruction to display the AR object in an environment of the second party as a segment of the video conference; the second party being remotely located from the first party.

2. The server in accordance with claim 1, wherein the at least one memory and the computer program code configured to, with the at least one processor, cause the server at least to:
    generate the AR object relating to the object and store the AR object in the database.

3. A server enabling Augmented Reality (AR) object sharing between a first party and a second party, the server comprising:
    at least one processor; and
    at least one memory including computer program code, the at least one memory and the computer program code configured to, with the at least one processor, cause the server at least to:
        receive, from a first party device, data corresponding to a selection of an object by the first party;
        retrieve, from a database operationally coupled with the server, an AR object relating to the received data in response to the receipt of the data;
        provide, to the second party device, an instruction to display the retrieved AR object;
        receive, from the second party device, an input from the second party in relation to the AR object, the input comprising one or more comments of the second party;
        provide, to a video conference server for a video conference, an instruction to set up a video conference between the first party and the second party, the video conference server being operationally communicable with the server; and
        provide, to the second party device, an instruction to display the AR object in an environment of the second party as a segment of the video conference, the second party being remotely located from the first party.

4. A server enabling Augmented Reality (AR) object sharing between a first party and a second party, the server comprising:
    at least one processor; and
    at least one memory including computer program code, the at least one memory and the computer program code configured to, with the at least one processor, cause the server at least to:
        receive, from a first party device, data corresponding to a selection of an object by the first party, the data comprising a request for payment for the selected object;
        retrieve, from a database operationally coupled with the server, an AR object relating to the received data in response to the receipt of the data;
        provide, to the second party device, an instruction to display the retrieved AR object;
        receive, from the second party device, an input from the second party in relation to the AR object, the input comprising one or more comments of the second party including an approval or rejection of payment of the selected object;
        provide, to the second party device, the instruction to display the retrieved AR object and request for payment; and
        receive, from the second party device, the input comprising the approval or the rejection of payment for the selected object from the second party in response to displaying the request for payment.

5. The server in accordance with claim 4, wherein the at least one memory and the computer program code configured to, with the at least one processor, cause the server at least to:
    determine whether an approval from a third party is required before payment for the selected object is finalized based on a pre-registered information in response to receipt of the approval of payment for the selected object from the second party.

6. The server in accordance with claim 5, wherein the at least one memory and the computer program code configured to, with the at least one processor, cause the server at least to:
    provide, to a third party device, an instruction to display the retrieved AR object and request for payment, when it is determined that the approval from the third party is required; and
    receive, from the third party device, the input comprising the approval or the rejection of payment for the selected object from the third party in response to displaying the request for payment.

7. The server in accordance with claim 5, wherein the at least one memory and the computer program code configured to, with the at least one processor, cause the server at least to:
provide, to an issuer server, the instruction to proceed with the payment for the selected object, the issuer server relating to an issuer predetermined by the second party and/or third party, when it is determined that the approval from the third party is not required or the approval from the third party is received from the third party.

8. The server in accordance with claim 6, wherein the at least one memory and the computer program code configured to, with the at least one processor, cause the server at least to:
provide, to the first party device, the instruction to the first party to change the selection of object in response to receipt of the rejection of payment for the selected object.

9. The server in accordance with claim 6, wherein the at least one memory and the computer program code configured to, with the at least one processor, cause the server at least to:
provide, to an issuer server, the instruction to proceed with the payment for the selected object, the issuer server relating to an issuer predetermined by the second party and/or third party, when it is determined that the approval from the third party is not required or the approval from the third party is received from the third party.

10. The server in accordance with claim 4, wherein the at least one memory and the computer program code configured to, with the at least one processor, cause the server at least to:
provide, to the first party device, the instruction to the first party to change the selection of object in response to receipt of the rejection of payment for the selected object.

11. A computer-implemented method for enabling Augmented Reality (AR) object sharing between a first party and a second party, wherein the computer-implemented method is performed by at least one processor and at least one memory including computer program code, said computer-implemented method comprising:
receiving, from a first party device, data corresponding to a selection of an object by the first party;
retrieving, from a database operationally coupled with the server, an AR object relating to the received data in response to the receipt of the data;
providing, to the second party device, an instruction to display the retrieved AR object;
receiving, from the second party device, an input from the second party in relation to the AR object, the input comprising one or more comments of the second party;
providing, to the first party device and the second party device, an instruction to set up a video conference between the first party and the second party; and
providing, to the second party device, an instruction to display the AR object in an environment of the second party as a segment of the video conference; the second party being remotely located from the first party.

12. The method in accordance with claim 11, further comprising:
generating the AR object relating to the object and storing the AR object in the database.

13. A computer-implemented method for enabling Augmented Reality (AR) object sharing between a first party and a second party, wherein the computer-implemented method is performed by at least one processor and at least one memory including computer program code, said computer-implemented method comprising:
receiving, from a first party device, data corresponding to a selection of an object by the first party;
retrieving, from a database operationally coupled with the server, an AR object relating to the received data in response to the receipt of the data;
providing, to the second party device, an instruction to display the retrieved AR object;
receiving, from the second party device, an input from the second party in relation to the AR object, the input comprising one or more comments of the second party;
providing, to a video conference server for a video conference, an instruction to set up a video conference between the first party and the second party, the video conference server being operationally communicable with the server; and
providing, to the second party device, an instruction to display the AR object in an environment of the second party as a segment of the video conference, the second party being remotely located from the first party.

14. The method in accordance with claim 13, further comprising:
determining whether an approval from a third party is required before payment for the selected object is finalized based on a pre-registered information in response to receipt of the approval of payment for the selected object from the second party.

15. The method in accordance with claim 14, further comprising:
providing, to a third party device, an instruction to display the retrieved AR object and request for payment, when it is determined that the approval from the third party is required; and
receiving, from the third party device, the input comprising the approval or the rejection of payment for the selected object from the third party in response to displaying the request for payment.

16. The method in accordance with claim 15, further comprising:
providing, to the first party device, the instruction to the first party to change the selection of object in response to receipt of the rejection of payment for the selected object.

17. The method in accordance with claim 15, further comprising:
providing, to an issuer server, the instruction to proceed with the payment for the selected object, the issuer server relating to an issuer predetermined by the second party and/or third party, when it is determined that the approval from the third party is not required or the approval from the third party is received from the third party.

18. The method in accordance with claim 14, further comprising:
providing, to an issuer server, the instruction to proceed with the payment for the selected object, the issuer server relating to an issuer predetermined by the second party and/or third party, when it is determined that the approval from the third party is not required or the approval from the third party is received from the third party.

19. The method in accordance with claim 13, further comprising:

providing, to the first party device, the instruction to the first party to change the selection of object in response to receipt of the rejection of payment for the selected object.

20. A computer-implemented method for enabling Augmented Reality (AR) object sharing between a first party and a second party, wherein the computer-implemented method is performed by at least one processor and at least one memory including computer program code, said computer-implemented method comprising:

receiving, from a first party device, data corresponding to a selection of an object by the first party, the data comprising a request for payment for the selected object;

retrieving, from a database operationally coupled with the server, an AR object relating to the received data in response to the receipt of the data;

providing, to the second party device, an instruction to display the retrieved AR object;

receiving, from the second party device, an input from the second party in relation to the AR object, the input comprising one or more comments of the second party including an approval or rejection of payment of the selected object;

providing, to the second party device, the instruction to display the retrieved AR object and request for payment; and receiving, from the second party device, the input comprising the approval or the rejection of payment for the selected object from the second party in response to displaying the request for payment.

* * * * *